(12) United States Patent
Toyama et al.

(10) Patent No.: US 10,461,328 B2
(45) Date of Patent: Oct. 29, 2019

(54) CATHODE ACTIVE MATERIAL USED FOR LITHIUM ION SECONDARY BATTERY AND LITHIUM ION SECONDARY BATTERY USING SAME

(71) Applicant: HITACHI METALS, LTD., Tokyo (JP)

(72) Inventors: Tatsuya Toyama, Tokyo (JP); Hisato Tokoro, Tokyo (JP); Shin Takahashi, Tokyo (JP); Akira Gunji, Tokyo (JP); Shuichi Takano, Tokyo (JP); Takashi Nakabayashi, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/780,026

(22) PCT Filed: May 23, 2017

(86) PCT No.: PCT/JP2017/019120
§ 371 (c)(1),
(2) Date: May 30, 2018

(87) PCT Pub. No.: WO2017/208894
PCT Pub. Date: Dec. 7, 2017

(65) Prior Publication Data
US 2018/0366727 A1    Dec. 20, 2018

(30) Foreign Application Priority Data

May 30, 2016    (JP) .................................. 2016-107862

(51) Int. Cl.
*H01M 4/525*    (2010.01)
*H01M 4/505*    (2010.01)
(Continued)

(52) U.S. Cl.
CPC ............ *H01M 4/525* (2013.01); *C01G 53/42* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS

| 7,132,197 B2 * | 11/2006 | Miyaki | ................. H01M 4/364 429/218.1 |
| 2003/0054248 A1 * | 3/2003 | Noda | .................... H01M 4/131 429/224 |

(Continued)

FOREIGN PATENT DOCUMENTS

| JP | 08-37007 A | 2/1996 |
| JP | 2010-070427 A | 4/2010 |

(Continued)

OTHER PUBLICATIONS

English machine translation of Matsubara (JP 2014-203665 A; an IDS reference), (Year: 2014).*

(Continued)

*Primary Examiner* — Katie L. Hammer
(74) *Attorney, Agent, or Firm* — Volpe and Koenig, P.C.

(57) ABSTRACT

Provided are a cathode active material used for a lithium ion secondary battery capable of sufficiently realizing both high charge/discharge capacities and excellent cycle properties, and a lithium ion secondary battery using the cathode active material. The cathode active material contains a plurality of secondary particles formed via agglomeration of a plurality of primary particles of a lithium transition metal composite oxide. Spreading resistance distributions of the secondary particles respectively observed in cross-sections at optional (Continued)

three positions of the cathode active material are measured so as to afford average values of spreading resistance of the secondary particles in the respective cross-sections. The average values of spreading resistance of the secondary particles are further averaged. The resultant averaged value of spreading resistance is made to enter the range of $1.0 \times 10^6$ Ω/cm or more and $1.0 \times 10^{10}$ Ω/cm or less.

8 Claims, 4 Drawing Sheets

(51) Int. Cl.
*C01G 53/00* (2006.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2002/54* (2013.01); *C01P 2004/01* (2013.01); *C01P 2004/50* (2013.01); *C01P 2006/40* (2013.01); *H01M 2004/021* (2013.01); *H01M 2004/028* (2013.01)

(56) References Cited

U.S. PATENT DOCUMENTS

| | | | | |
|---|---|---|---|---|
| 2004/0058244 | A1* | 3/2004 | Hosoya | H01M 4/131 429/231.1 |
| 2009/0148772 | A1* | 6/2009 | Kawasato | C01G 51/42 429/223 |
| 2013/0330613 | A1* | 12/2013 | Saruwatari | H01M 4/131 429/211 |
| 2014/0304862 | A1 | 10/2014 | Matsubara | |

FOREIGN PATENT DOCUMENTS

| | | |
|---|---|---|
| JP | 2010-192424 A | 9/2010 |
| JP | 2013-93171 A | 5/2013 |
| JP | 2014-203665 A | 10/2014 |
| JP | 2015-185401 A | 10/2015 |

OTHER PUBLICATIONS

English machine translation of Fukui et al. (JP 2010-192424 A; an IDS reference), (Year: 2010).*
International Search Report for WO 2017/208894 A1, dated Aug. 15, 2017.

* cited by examiner

CATHODE ACTIVE MATERIAL USED FOR LITHIUM ION SECONDARY BATTERY AND LITHIUM ION SECONDARY BATTERY USING SAME

FIELD OF INVENTION

The present invention relates to a cathode active material used for a lithium ion secondary battery, and a lithium ion secondary battery using the cathode.

BACKGROUND ART

Recently, great expectations have been placed on an electric vehicle consuming less energy in travelling and a power generation system using natural energy like solar light and wind power in view of preventing global warming and concerns for depletion of fossil fuels. However, the above technologies have the following technological disadvantages, which prevents wide spread of those technologies.

An electric vehicle is provided with a driving battery with a low charge/discharge capacity, and therefore tends to have a shorter travel distance than a typical vehicle per one-time charge. Meanwhile, a power generation system using natural energy is provided with a large capacity of battery for leveling outputs from largely fluctuated power generation, likely resulting in a factor of high costs. Thus, as for any of the above technologies, demanded is an inexpensive secondary battery having a high charge/discharge capacity to solve the above disadvantages.

For example, a lithium ion secondary battery has a charge/discharge capacity higher than secondary batteries such as a nickel-hydrogen battery and a lead battery. Therefore, a lithium ion secondary battery is expected to be applied to a battery for driving an electric vehicle and a power generation system. However, a more greatly improved lithium ion secondary battery having a further increased charge/discharge capacity is strongly desired to meet the demands on a battery for driving an electric vehicle and a power generation system. For satisfying those demands, a cathode and an anode of a lithium ion secondary battery are preferably to have more greatly increased charge/discharge capacities.

As for a cathode active material included in a cathode of a lithium ion secondary battery, a raw material having a layered structure assigned to R3-m and represented by the composite formula of $LiMO_2$ (i.e., a layered structural compound, where N is a metal element other than Li) has been widely used. In the raw material, when Ni is largely contained as a metal element H, a higher content of Ni tends to improve a battery capacity of a lithium ion secondary battery. Particularly, when a content of Ni in the metal element M is more than 70 atom %, a high reversible capacity of more than 180 Ah/kg can be achieved, allowing improvement of the charge/discharge capacity per mass.

On the other hand, realization of such a high reversible capacity causes a large volume change in a crystal structure at charge/discharge operation, by which particles of a cathode active material cause cracks associated with charge/discharge cycles. Accordingly, particle resistance increases (i.e., conductivity decreases) so that DC resistance of a lithium ion secondary battery increases. That is, internal resistance of battery increases associated with charge/discharge cycles. Hence, it is preferable to prevent such an increase in the internal resistance in order to achieve an excellent cycle property.

Here, a technology described in Patent Document 1 is known related to a technology for realizing both highly improved outputs and longer duration. Patent Document 1 discloses a cathode used for a lithium ion secondary battery that includes a compound as an active material capable of intercalating/de-intercalating lithium ions. Herein, the cathode contains a conductive agent and a binder. When a specific surface area of an active material is A ($m^2/g$), a content of the active material in the electrode is B mass %, a specific surface area of the conductive material is C ($m^2/g$), a content of the conductive material in the electrode is D mass %, and an exposed ratio of the active material of a cathode bending cross-section is E (%), a cathode used for a lithium ion secondary battery satisfying the following equation (1) is described.

$$E<50\times(A\times B+0.05\times C\times D)/(A\times B+0.1\times C\times D) \quad \text{Equation (1)}$$

DOCUMENTS OF PRIOR ART

Patent Documents

Patent Document 1: Japanese Unexamined Patent Application Publication No. 2013-93171

SUMMARY OF INVENTION

Problems to be Solved by Invention

Here, Patent Document 1 describes that a volume resistivity value of a lithium transition metal based powdery compound is preferably in the predetermined range (especially paragraph 0046 in the specification of Patent Document 1). Here, the volume resistivity is measured in the state where many secondary particles are agglomerated. Thus, when both secondary particles with high resistance due to cracks and surface deterioration, and other secondary particles with low resistance are included, a current preferentially passes through the latter secondary particles, letting the volume resistivity appear decreased. In this case, such particles appear to be a cathode active material having good performance, although the secondary particles forming the active material actually include cracks and much room for improving the cycle properties.

As mentioned above, even though a cathode active material having good properties based on the volume resistivity in the technology described in Patent Document 1, actually obtained may be a cathode active material still having much room for the improvement. Namely, the technology described in Patent Document 1 did not accurately evaluate the secondary particles of the cathode active material.

The present invention has been developed in view of the above disadvantages. Therefore, an object of the present invention is to provide a cathode active material used for a lithium ion secondary battery capable of realizing sufficiently both the high charge/discharge capacity and the good cycle properties, and a lithium ion secondary battery using the cathode active material.

Means for Solving Problems

The present inventors have keenly investigated to solve the above described disadvantages. As a result, the inventors have found that those disadvantages were solved by performing the following processes. Namely, a key aspect of the present invention is a cathode active material used for a lithium ion secondary battery including a plurality of secondary particles formed via agglomeration of a plurality of primary particles of a lithium transition metal composite oxide.

Herein, a spreading resistance distribution of the respective secondary particles is measured thus observed in respective cross-sections at optional three locations of the active material. Then, average values of spreading resistance of the secondary particles thus observed in the respective cross-sections are calculated. Then, the three average values of spreading resistance thus calculated are further averaged, and a value thus obtained from the above average values is defined as spreading resistance of the cathode active material. Under the definition, an average value of the spreading resistance thus obtained is $1.0 \times 10^6$ Ω/cm or more and $1.0 \times 10^{10}$ Ω/cm or less with respect to the lithium ion secondary battery. Other solutions will described hereinafter in the embodiments for carrying out the invention.

Effect of Invention

According to the present invention, provided are a cathode active material used for a lithium ion secondary battery, which is capable of realizing sufficiently both the high charge/discharge capacities and the good cycle properties, and a lithium ion secondary battery using the cathode active material.

BRIEF DESCRIPTION OF DRAWINGS

FIGS. 1A and 1B are drawing substitute photographs taken by scanning spreading resistance microscopy on cross-sections of a cathode active material in the present embodiment. FIG. 1A is a photograph of a cathode active material in the present embodiment.

FIGS. 2A and 2B are drawings schematically showing the drawing substitute photographs taken by scanning spreading resistance microscopy of FIGS. 1A and 1B, respectively.

EMBODIMENTS FOR CARRYING OUT INVENTION

Hereinafter, aspects (i.e., embodiments) for carrying out the present invention will be described appropriately referring to attached drawings. Note, in the following descriptions, the phrases of "more than (numeral value)" and "less than (numeral value)" mean that the numeral value is not included. In contrast, the phrases of "(numeral value) or more" and "(numeral value) or less" mean that the numeral value is included.

[1. Cathode Active Material]

A cathode active material used for a lithium ion secondary battery according to the present embodiment includes a plurality of secondary particles formed via agglomeration of a plurality of primary particles of a lithium transition metal composite oxide working as a cathode active material. Those secondary particles are Generally solid particles. Here, the term of "solid" will be described later referring to FIGS. 1A and 1B, etc. A cathode active material of the present embodiment is prepared first as a slurry type cathode mixture (i.e., cathode material) including, for example, a binder and a solvent. Subsequently, the resulting cathode mixture is applied to a metal sheet and dried, thereby to produce a cathode included in the lithium ion secondary battery.

<Primary Particle>

Primary particles of the cathode active material are formed of a lithium transition metal composite oxide as mentioned above. More specifically, in the present embodiment, the lithium transition metal composite oxide is a compound represented by the following formula (1).

$$Li_{1+a}Ni_bCo_cMn_dM^1_eO_{2+\alpha} \qquad \text{Formula (1)}$$

In the formula (1), $M^1$ is a metal element other than Li, Ni, Mn and Co; "a", "b", "c", "d", "e" and "α" are respectively numerals satisfying the following relationships: $-0.03 \le a \le 0.11$, $0.7 \le b \le 1.0$, $0 < c < 0.3$, $0 \le d < 0.3$, $0 \le e < 0.1$, $b+c+d+e=1$, and $-0.2 < \alpha < 0.2$.

As shown in Formula (1), use of the lithium transition metal composite oxide containing Ni, Co and Mn as a cathode active material may achieve an intercalation/de-intercalation potential of lithium ions is high of 3V or more as well as a high charge/discharge capacity. Further, containing those elements may secure electrochemical properties of the cathode active material.

As for $M^1$, included are, for example, various elements such as B, Al, Ti, V, Zr, Nb, Mo, and W. Those elements may be used as one element alone, or in any combination with 2 or more elements at any ratio. Replacement of the above described Ni, Co and Mn included in the transition metal site with $M^1$ may improve the stability of the crystal structure and the electrochemical properties (i.e., cycle properties) of the layered cathode active material. As for preferable $M^1$s among those elements, especially Ti and Zr can preferably suppress exposure of Ni ions on a surface of the cathode active material, and further preferably prevent the decomposition reaction of an electrolyte solution caused in association with the charge/discharge cycles.

Here, "a" represents an excess or a deficiency relative to the stoichiometric ratio (i.e., Li:M:O=1:1:2) of the cathode active material represented by the formula: $LiMO_2$. That is, the larger a content of Li increases, the higher a valence of the transition metal before charge becomes, which decreases a degree of the valence change in the transition metal when Li is de-intercalated. This phenomenon allows improvement of the charge/discharge cycle properties. On the contrary, the larger a content of Li increases, the lower a charge/discharge capacity of the layered cathode active material becomes.

Accordingly, preferably "a" is set to −0.03 or more and 0.11 or less, more preferably −0.03 or more and 0.10 or less, most preferably 0.0 or more and 0.06 or less. Here, "a" of −0.03 or more can prevent change in the crystal structure in the charge state through a small degree of cation mixing. Further, "a" of 0.11 or less can sufficiently secure the charge compensation via valence change of the transition metal. Those features may realize both the high battery capacity (i.e., high charge/discharge capacity) and the high cycle properties.

Next, "b" represents a content of Ni, and preferably is set to 0.7 or more. The larger "b" is, the higher the capacity likely becomes. On the other hand, "b" is preferably set to less than 1.0. Here, "b" of less than 1.0 can prevent the crystal structure from being instable possibly caused by replacement of elements in the Li site with Ni, allowing the cycle properties to be kept in high.

Next, "c" represents a content of Co. Preferably, "c" is set to more than 0 and less than 0.3, more preferably 0.05 or more and 0.2 or less. Further, "c" of 0.05 or more can stabilize the crystal structure, thereby allowing further improvement of the charge/discharge cycles. On the other hand, "c" set to less than 0.3 can sufficiently secure the above described Ni content, and maintain the high capacity.

Next, d represents a content of Mn. Here, "d" is preferably set to 0 or more and less than 0.3, more preferably 0.0 or more and 0.2 or less. The larger "d" is set, the more the crystal structure can be stabilized, thereby allowing more improvement of the charge/discharge cycle properties. Further, "d" set to less than 0.3 can sufficiently secure the above described Ni content, resulting in maintenance of the high capacity. Here, when the valence of Mn is 4, Mn may not be included due to no contribution of Mn to charge/discharge cycles.

Next, "e" represents a content of the metal element $M^1$. Preferably, "e" is set to 0 or more and less than 0.1, more preferably 0.0 or more and 0.08 or less. Containing the metal element $M^1$ (i.e., e is set to more than 0) can stabilize the crystal structure and surface structure of the cathode active material and therefore further increase the charge/discharge cycle properties. Note, metal element $M^1$ may not be contained (i.e., $M^1=0$). Further, "e" set to less than 0.1 can sufficiently secure the content of Ni, thereby allowing the maintenance of the high capacity.

(Secondary Particle)

Secondary particles of the cathode active material in the present embodiment are formed via agglomeration of the plurality of above described primary particles. Herein, a shape of the agglomeration is not specifically limited. However, generally the primary particles are agglomerated via sinter bonding to form a secondary particle. Further, in the cathode active material of the present embodiment, the respective secondary particles are generally solid particles, and the plurality of secondary particles thus contained form the cathode active material in present embodiment. Next, "solid secondary particles" will be described referring to the attached drawings.

Figure 1A:
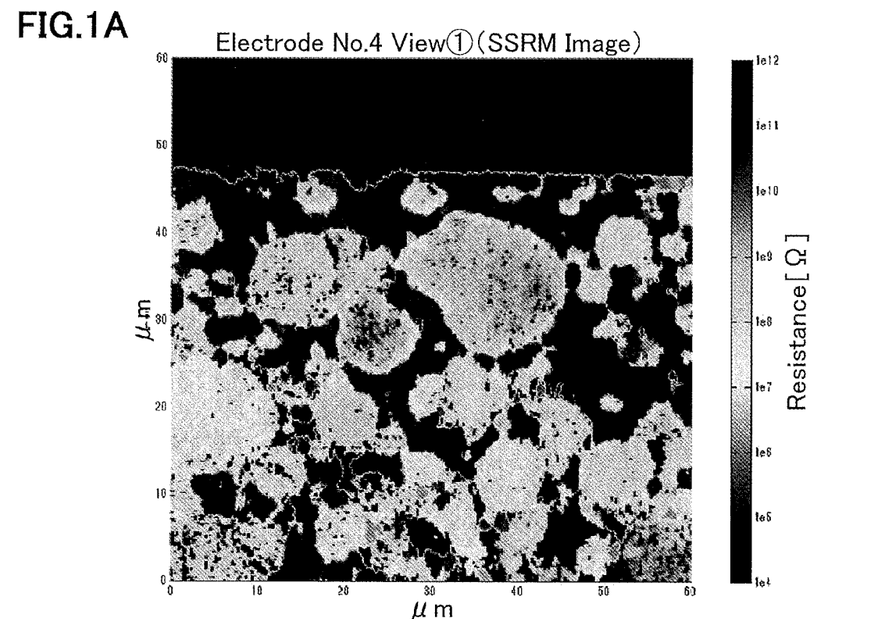
Figure 1B:
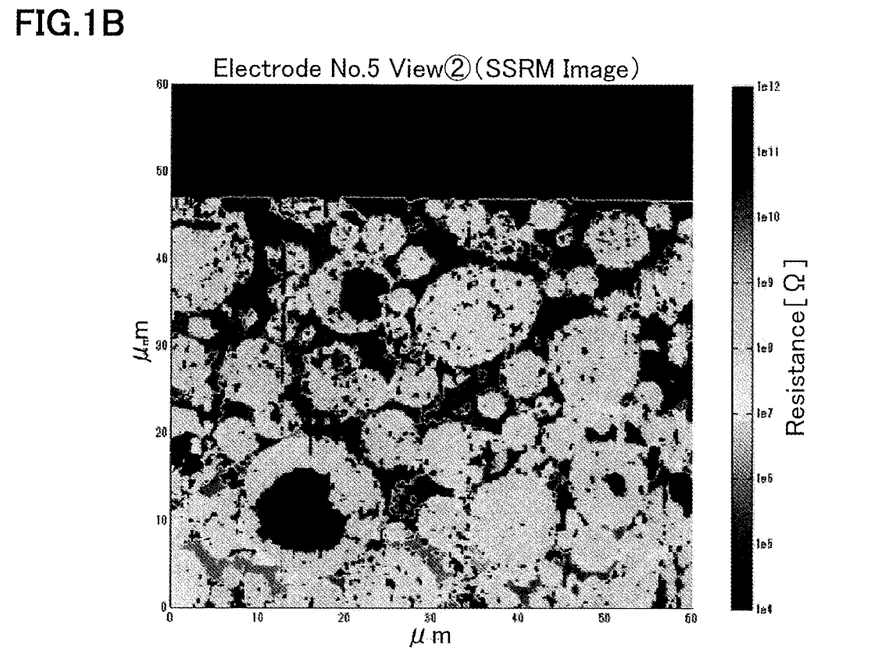
FIG. 1B is a photograph of a conventional cathode active material.
Figure 2A:
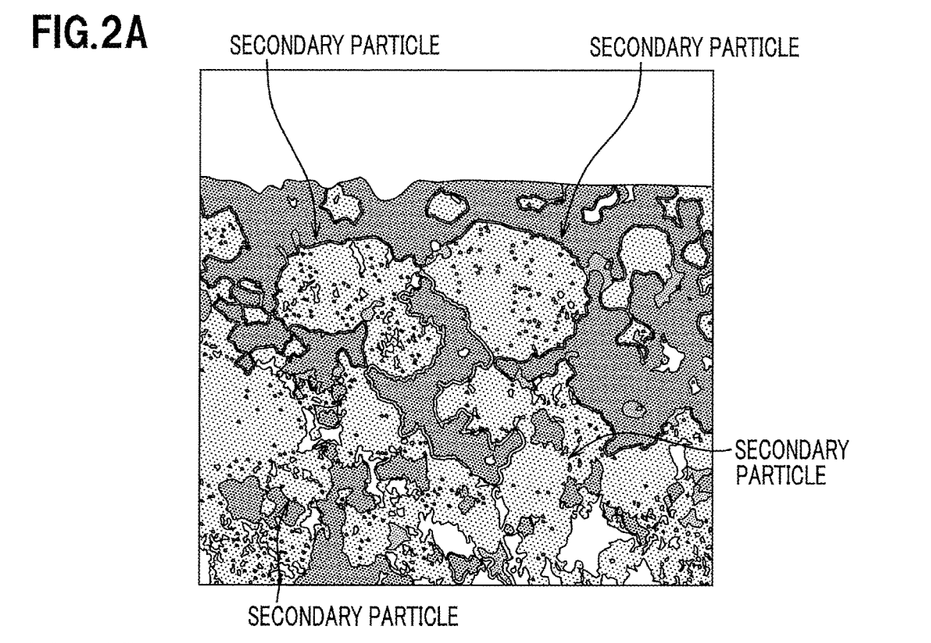
FIG. 2A is a schematic drawing corresponding to FIG. 1A.
Figure 2B:
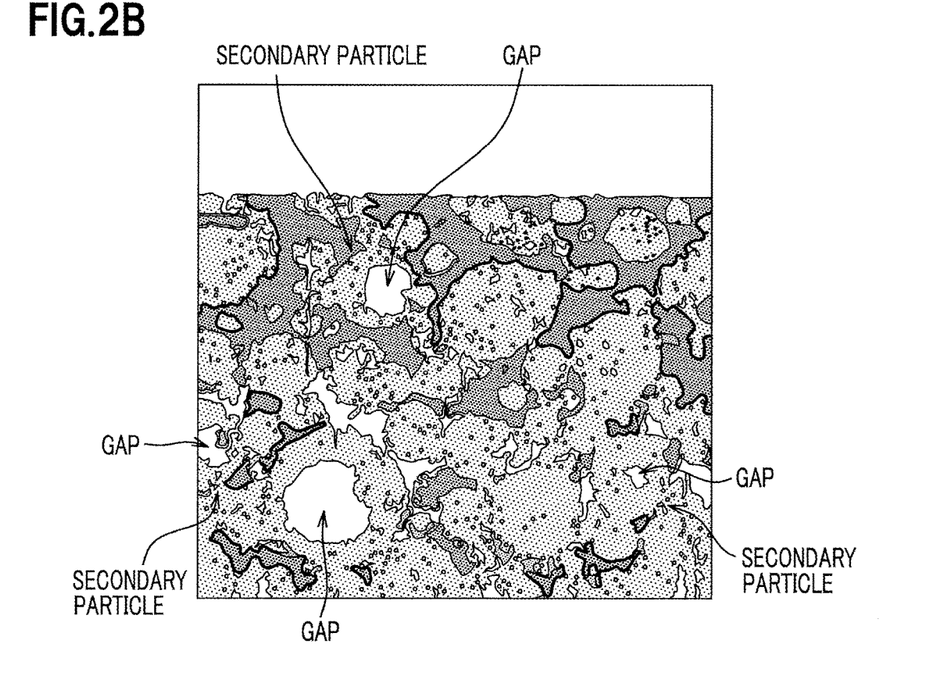
FIG. 2B is a schematic drawing corresponding to FIG. 1B.

FIGS. 1A and 1B are drawing substitute photographs taken by scanning spreading resistance microscopy with respect to cross-sections of the cathode active material in the present embodiment. FIG. 1A is a photograph of the cathode active material in the present embodiment. FIG. 1B is a photograph of a cathode active material a comparative example. Further, FIGS. 2A and 2B are drawings schematically showing the above drawing substitute photographs taken by the scanning spreading resistance microscopy of FIGS. 1A and 1B, respectively. FIG. 2A is a schematic drawing corresponding to FIG. 1A, and FIG. 2B is a schematic drawing corresponding to FIG. 1B.

Here, it may be difficult to grasp aspects of the secondary particles, etc. by the photographs taken by the scanning spreading resistance microscopy as shown in FIGS. 1A and 1B. Therefore, in the following descriptions, the cathode active material in the present embodiment will be described mainly referring to FIGS. 2A and 2B schematically showing the photographs of FIGS. 1A and 1B.

In FIGS. 2A and 2B, a dark dot pattern is drawn when the spreading resistance is small. On the contrary, a light dot pattern is drawn when the spreading resistance is large. Note, in FIGS. 1A and 1B, a whitish area is a portion where the spreading resistance is relatively small, while a darkish area is a portion where the spreading resistance is relatively large.

As shown in FIG. 2A (i.e., a material prepared in Example 3 described hereinafter), a lot of agglomerated secondary particles are present in the cathode active material in the present embodiment. In FIG. 2A, only three secondary particles are pointed out for explanation. Here, dot patterns inside those secondary particles are relatively equal and the insides of the secondary particles are equally filled. That is, the insides thereof are solid. Other secondary particles not pointed out in FIG. 2A are similarly solid. The solid secondary particles can increase the electric conductivity inside the secondary particles thereby to achieve high cycle properties. In the present specification, a secondary particle of which inside is visually filled via observation of the cross-section taken by the scanning spreading resistance microscopy (SSRM, the detail will be described later) is referred to as a "solid secondary particle".

On the contrary, as shown in FIG. 2B (i.e., a material prepared in Comparative Example 3), many agglomerated secondary particles are present in a cathode active material of the comparative example. However, large gaps are present inside a part of the secondary particles shown in FIG. 2B of the comparative example. That is, dot patterns inside a part of the secondary particles are not equal (i.e., large black areas are present inside the secondary particles in FIG. 1B), and the spreading resistance locally increases at those areas. This phenomenon suggests that a gap is formed at the area having large spreading resistance inside the secondary particles. In the present specification, a secondary particle including a gap is determined as a "non-solid (or hollow) secondary particle".

Gaps shown in FIG. 2B decrease electronic conductivity of the secondary particles, which causes a decrease in the charge/discharge cycle properties. However, in FIG. 2B, if the electric conductivity of a portion other than the above described gaps is high, electric conductivity of the entire cathode active material becomes high, apparently showing good cycle properties. Therefore, in the prior art where a volume resistivity is used as an index, even though gaps are present in particles of a cathode active material as shown in FIG. 2B, such a cathode active material has been determined to have good cycle properties.

However, in the present embodiment, whether or not cycle properties are good is evaluated via checking the presence of those gaps as mentioned above. Accordingly, secondary particles having low electric conductivity due to presence of the gaps (e.g., particles shown in FIG. 2B) may be determined to have more room for still improving the cycle properties. Thus, it is possible to accurately evaluate preferability of the cycle properties by correctly checking the condition of the secondary particles following the above described standard.

Further, in the cathode active material of the present embodiment, a value of spreading resistance of the secondary particles included therein is adjusted in a predetermined range. More specifically, measured are spreading resistance distributions of the secondary particles observed in three cross-sections thus taken in optional three positions of the active material. Then, average values of spreading resistance of the secondary particles thus observed in the respective cross-sections are further averaged. Here, the resultant averaged value of the spreading resistance thus calculated is $1.0 \times 10^6$ Ω/cm or more and $1.0 \times 10^{10}$ Ω/cm or less.

Here, spreading resistance is used as an index for identifying the cathode active material in the present embodiment. The spreading resistance is measured by a conductive probe via scanning a sample surface applied with a bias voltage, and 2-dimensionally measuring a distribution of resistance values, thereby to visualize spreading resistance just under the probe. Such local resistance is called spreading resistance, and low and high degrees of resistance values are represented by dark and light colors. Hereby, the spreading resistance is measured on the respective secondary particles of the cathode active material. The spreading resistance can be measured by using, for example, a scanning spreading resistance microscope (SSRM: Hitachi High-Tech Science Corporation) or the like.

Meanwhile, a volume resistivity conventionally used for representing properties of a cathode active material is a value calculated by dividing an intensity of DC electric field inside a sample to a measurement target (e.g., cathode active material itself) by a current density in a steady state. Note, actually a volume resistivity is calculated by converting a volume resistance value into that of a cubic having a unit volume. That is, a volume resistivity corresponds to volume resistance measured between two electrodes oppositely arranged on parallel planes of a unit volume cubic.

Accordingly, volume resistance is calculated by measuring the entire cathode active material including secondary particles. Therefore, if electric conductive paths are sufficiently present in a sample to be a measurement target, a small volume resistivity is measured despite of the actual condition of the sample to be the measurement target. Hence, even if many cracks are actually present among secondary particles of a cathode active material, such a cathode active material has been sometimes determined as a good cathode active material.

However, spreading resistance is used as an index for the cathode active material in the present embodiment as mentioned above. Defining the spreading resistance as an index may determine a low or high degree of the local spreading resistance as described hereinbefore. Further, properties of the cathode active material can be evaluated by calculating an average value of the spreading resistance thus measured via intentionally considering the spreading resistance of every secondary particle included in the cathode active material. This procedure can more accurately evaluate the properties than conventional ones.

Here, as mentioned above, a value of the spreading resistance is set to $1.0 \times 10^6$ Ω/cm or more and $1.0 \times 10^{10}$ Ω/cm or less, preferably $1.0 \times 10^7$ Ω/cm or more and $0.90 \times 10^9$ Ω/cm or less, more preferably $1.0 \times 10^8$ Ω/cm or more and $0.6 \times 10^9$ Ω/cm or less. The above range of the spreading resistance value can provide the cathode with highly increased outputs and also suppress surface deterioration such as cracks of particles, thereby to achieve high cycle properties. The spreading resistance value particularly of $1.0 \times 10^6$ Ω/cm or more can secure a certain degree of gaps inside the secondary particles, allowing absorption of expansion/contraction of the cathode active material caused in association with charge/discharge cycles.

This advantageous effect can prevent cracks of the secondary particles and keep the cycle properties at high degree. Further, the spreading resistance value of $1.0 \times 10^{10}$ Ω/cm or less can decrease the resistance of the secondary particles and increase the electric conductivity, resulting in improvement of the output properties. Moreover, the spreading resistance value of $0.9:0 \times 10^9$ Ω/cm or less can more decrease the resistance of the secondary particles and more increase the electric conductivity.

This adjustment can sufficiently improve the output properties. Note, it is preferable that the values of the spreading resistance of all the solid secondary particles are included in the above described range. However, even though a part of the solid secondary particles has spreading resistance values out of said range, it is good that a value of the spreading resistance calculated as mentioned above enters said range.

Here, preferably a value of the spreading resistance is within the above range in the initial state (i.e., state before charge/discharge operation of a lithium ion secondary battery including the cathode active material). However, preferably even a lithium ion secondary battery after subjected to 100 cycles of charge/discharge operation has a value of the spreading resistance still entering the above range. The spreading resistance value within the above range after subjected to 100 cycles can provide a lithium ion secondary battery having more excellent charge/discharge properties.

Further, even though secondary particles having large spreading resistance are present in a very small portion, it is construed that excellent battery performance can be achieved when the spreading resistance of other most portions is sufficiently small. Accordingly, as mentioned above, optional three cross-sections are selected, and average values of the spreading resistance in the respective cross-sections are calculated. Then, an average value of the three average values thus calculated construed as the spreading resistance of the entire cathode active material. This procedure enables accurate evaluation of the cathode active material.

Here, the cathode active material intercalates/de-intercalates lithium ions associated with charge/discharge operation, resulting in expansion/contraction of the crystal structure. At that time, when a suitable degree of gaps is not present inside the secondary particles, the secondary particles cause cracks thereby to increase new contact surfaces with an electrolyte solution. This increase in the contact surfaces tends to facilitate oxidative degradation of the electrolyte solution, so as to deteriorate the battery performance.

From the viewpoint of the above disadvantage, providing an appropriate pore volume inside the secondary particles may suppress generation of the cracks in the secondary particles caused in association with charge/discharge operation More specifically, it is preferable to set porosity of the cathode active material to 1% or more and 20% or less. Porosity included within this range may bring spreading resistance after subjected to 100 cycles into the above defined range. However, it should be noted that porosity of 3% or more and 15% or less is more preferable from the viewpoint of improvement for the cycle properties and the range of the spreading resistance.

Here, porosity can be measured by mercury intrusion porosimetry. When porosity is measured, a volume of micro pores having a micro pore diameter of 0.6 μm may be calculated in view of excluding the gaps among the secondary particles.

As for the cathode active material in the present embodiment, the spreading resistance does not necessarily correlate with the porosity. More specifically, the spreading resistance varies depending on whether the secondary particles are solid or not as described referring to FIGS. 2A and 2B. That is, the spreading resistance varies depending on the state inside the secondary particles. Therefore, even if the secondary particles have the same porosity, the spreading resistance when the particles are solid due to resultant dispersion of pores is greatly different from the spreading resistance when the particles are hollow due to resultant local concentration of pores.

Moreover, in the cathode active material of the present embodiment, the compound represented by Formula (1) is used as mentioned before. However, a specific composition of the lithium transition metal composite oxide used as the cathode active material of the present embodiment is not limited to the compound represented by Formula (1). That is, use of the cathode active material having the spreading resistance within the above measurement range as described before can produce a lithium ion secondary battery provided with a highly increased charge/discharge capacity as well as excellent cycle properties suppressing an increase in the resistance.

[2. Method for Producing Cathode Active Material]

A cathode active material may be produced by any method. For example, a cathode active material including secondary Particles may be produced by granulating primary particles of the cathode active material through dry-Granulation or wet-granulation to form secondary particles. Hereinafter, a method for producing a cathode active material will be more specifically described.

Figure 3:
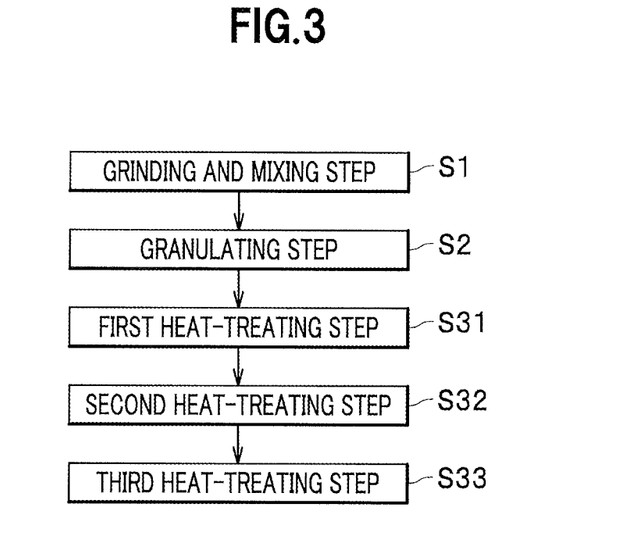
FIG. 3 is a flowchart showing a method for producing a cathode active material of the present embodiment.

FIG. 3 is a flowchart illustrating a method for producing a cathode active material in the present embodiment. As shown in FIG. 3, the cathode active material in the present embodiment can be produced via a grinding and mixing step S1, a Granulating step S2, a first heat-treating step S31, a second heat-treating step S32, and a third heat-treating step S33. Among those steps, heat treatment is carried out in each of the first heat-treating step S31, the second heat-treating step S32, and the third heat-treating step S33. However, the method is not limited to three-stage heat treatment. Hereinafter, the method for producing the cathode active material in the present embodiment will be described by every step.

(Grinding and Mixing Step S1)

The grinding and mixing step S1 is performed by grinding and mixing a starting raw material including a metal element other than Li, and a lithium raw material containing lithium carbonate at 80 mass % or more, to prepare a mixture. As for a starting raw material including a metal element (i.e., Ni, Co, and $M^1$) other than Li in the above described Formula (1), appropriately selected is a compound formed of a carbonate, a hydroxide, an oxyhydroxide, an acetate, a citrate, an oxide, etc. of the above metal element together with C, H, O and N. Here, a carbonate and a hydroxide are especially desirable in view of an easy grinding property thereof and a gas releasing amount thus generated after heat decomposition.

In the grinding and mixing step S1, starting raw materials thus weighed are mixed at the ratio of a predetermined element composition corresponding to Formula (1), so as to prepare a raw material powder. Herein, the term of "starting raw materials" as mentioned above includes a Ni-containing compound, a Mn-containing compound, a Co-containing compound, and an $M^1$-containing compound, besides a Li-containing compound. In the method for producing a cathode active material of the present embodiment, lithium carbonate is used as a Li-containing compound. Here, lithium carbonate is more desirable due to the supply stability, low cost and weak alkaline properties than other Li-containing compounds such as lithium acetate, lithium nitrate, lithium hydroxide, lithium chloride, and lithium sulfate, etc. Those desirable properties of lithium carbonate decrease damage of a production device, allowing excellent industrial usability and practical use thereof.

Here, as for a Ni-containing compound, a Mn-containing compound, and a Co-containing compound, preferably used are, for example, an oxide, a hydroxide, a carbonate, a sulfate, and an acetate of Ni, Mn, and Co, and more preferably, especially used are an oxide, an hydroxide or a carbonate thereof. Further, as for an $M^1$-containing compound, used are, for example, an acetate, a nitrate, a carbonate, a sulfate, an oxide or a hydroxide of $M^1$, and more preferably, especially used are a carbonate, an oxide or a hydroxide thereof.

In the grinding and mixing step S1, preferably the starting raw materials are ground by, for example, a grinder, and then mixed together. The procedure can prepare a powdery solid mixture thus uniformly mixed. As a grinder that grinds compounds of the starting raw materials, used are fine grinders such as a boll-mill, a jet-mill, a rod-mill, and a sand-mill. Herein, used are both methods including a wet-milling process of grinding the materials in a liquid like water, and a dry-milling method of using no liquid. In view of preparing a ground and mixed powder having a small particle diameter, a wet-milling process is more desirable. Namely, in the grinding and mixing step S1, it is preferable to make the resultant mixture to a slurry thereof by a wet-milling process.

(Granulating Step S2)

A granulating step S2 is performed by spraying a mixture thus made as a slurry in the grinding and mixing step S1 through a nozzle to be dried, thereby to granulate a precursor of the compound (1) (hereinafter, simply referring to as a "precursor"). It is preferable to use a spray-dry method. In the spray method, used are a binary fluid nozzle, a tetranary fluid nozzle, a disk type, a spray-dryer and a tumbling fluidized bed device or the like. Use of the spray-dry method and control of a spray amount and a slurry concentration can control porosity and spreading resistance of the compound (1). For example, increases in the spray amount and the slurry concentration can decrease the porosity of the compound (1). Further, porosity of the cathode active material may be made smaller in order to decrease the spreading resistance. As mentioned above, the spray amount and the slurry concentration may be increased for decreasing the porosity. As for specific conditions to use the spray-dry method, conditions described in Examples as mentioned hereinafter can be applied thereto.

(First Heat-Treating Step: S31) in a first heat-treating step S31, a second heat-treating step S32 and a third heat-treating step S33 both will be mentioned hereinafter, the compound (1) can be produced by firing the precursor thus obtained in the granulating step S2. Next, the respective steps will be described more specifically.

In the first heat-treating step S31, a first precursor is produced by heat-treating the precursor at a heat-treating temperature of 200° C. or more and 400° C. or less, and for a time of 0.5 hr or more and 5 hr or less. The first heat-treating step S31 is performed mainly for the purpose of removing vaporized components such as water that prevent a synthetic reaction of the cathode active material. In short, the first heat-treating step S31 is a heat-treating step of removing water contained in the mixture.

In the first heat-treating step S31, vaporized components thus included in the mixture to be heat-treated, for example, water, impurities and volatile components generated following heat decomposition are vaporized, burned and volatilized, thereby to generate gas. Further, in the first heat-treating step S31, the mixture to be heat-treated contains carbonates such as lithium carbonate. Hereby, carbon dioxide gas is also generated following the heat decomposition of the carbonates.

Here, in the first heat-treating step S31, a heat-treating temperature of less than 200° C. may fail in a sufficient combustion reaction of impurities and a sufficient heat decomposition reaction of the starting raw materials. Further, in the first heat-treating step S31, a heat-treating temperature of more than 400° C. may form a layered structure of the compound (1) under an atmosphere containing the gas generated from the mixture during the heat treatment. Accordingly, the heat treatment of the mixture at the heat-treating temperature of 200° C. or more and 400° C. or less can sufficiently remove the vaporized components like water, and simultaneously produce the first precursor which has not formed any layered structure.

Further, in the first heat-treating step S31, the heat-treating temperature preferably of 250° C. or more and 400° C. or less, more preferably of 250° C. or more and 380° C. or less can more improve the removal effect of volatilized components like water and the prevention effect of the layered structure formation. Moreover, a heat-treating time in the first heat-treating step S31 may be appropriately varied corresponding to, for example, a heat-treating temperature, a removal degree of the vaporized components and a prevention degree of the layered structure formation.

Furthermore, in the first heat-treating step S31, preferably the heat treatment is carried out under a gas flow condition of an atmospheric gas or a pump exhaust condition for the purpose of exhausting gas generated from the mixture thus heat-treated. Preferably, a flow rate per 1 min of the atmospheric gas or an exhausting volume per 1 min by a pump is set to larger than a volume of the gas generated from the mixture. Here, a volume of the gas generated from the mixture to be heat-treated in the first heat-treating step S31 may be calculated, for example, based on mass of the starting raw materials and a ratio of the vaporized components included in the mixture.

Further, the first heat-treating step S31 may be carried out under a reduced pressure equal to or of less than the atmospheric pressure. Moreover, an oxidative atmosphere of the first heat-treating step S31 may be the atmosphere since the first heat-treating step S31 is not mainly directed to the oxidative reaction. Use of the atmosphere as the oxidative atmosphere in the first heat-treating step S31 may easily supply the atmosphere and improve the productivity of the cathode active material, allowing a decrease in the production costs. Furthermore, a heat-treating atmosphere of the first heat-treating step S31 is not limited to an oxidative atmosphere. For example, a non-oxidative atmosphere like an inert gas may be used therefor.

(Second Heat-Treating Step: S32)

In a second heat-treating step S32 subsequently conducted after the first heat-treating step S31, the first precursor as described hereinbefore is heat-treated at a heat-treating temperature of 450° C. or more and 800° C. or less, and for a heat-treating time of 0.5 hr or more and 50 hr or less. Hereby, 93 mass % or more of lithium carbonate is made to react to produce a second precursor.

Here, the second heat-treating step S32 is carried out mainly for the purpose of converting lithium carbonate in the first precursor to lithium oxide, and also removing carbonate components via synthesizing a compound having a layered structure represented by the composition formula of LiM'O$_2$ through the reaction between lithium carbonate and transition metals (i.e., Ni, Co and M$^1$). In short, the second heat-treating step S32 is a heat-treating step of removing carbonate components included in the first precursor.

Here, a heat-treating temperature of less than 450° C. in the second heat-treating step S32 remarkably slows down a formation reaction of a layered structure when the second precursor having a layered structure is formed via heat treatment of the first precursor. This range of temperature allows lithium carbonate to tend to excessively remain. On the other hand, a treating temperature of more than 800° C. in the second heat-treating step S32 excessively facilitates growth of particles, thereby preventing formation of a cathode active material with a high capacity. Further, a heat-treating temperature preferably set to 600° C. or more in the second heat-treating step S32 can facilitate lithium carbonate to more actively react.

On the contrary, a heat-treating temperature set to 700° C. or less in the second heat-treating step S32 can further improve a prevention effect of crystal particles from glowing.

Further, a heat-treating time may be set to 0.5 hr or more and 50 hr or less so as to allow the first precursor to sufficiently react with oxygen in the above range of the heat-treating temperature in the second heat-treating step S32. In view of improving the productivity, preferably a heat-treating time is set to 2 hr or more and 15 hr or less in the second heat-treating step S32.

(Third Heat-Treating Step: S33)

A third heat-treating step S33 subsequently conducted after the second heat-treating step S32 heat-treats the second precursor at a heat-treating temperature of 750° C. or more and 900° C. less, more preferably of 775° C. or more and 900° C. less. At that step, a heat-treating time is set to 0.5 hr or more and 50 hr or less, preferably 1 hr or more and 15 hr or less from the viewpoint of improving productivity of the cathode active material. This heat-treatment produces the compound (1).

The compound (1) thus obtained in the third heat-treating step S33 is included in a cathode active material (i.e., compound (1) of the present embodiment). The third heat-treating step S33 is carried out for the purpose of sufficiently facilitating a Ni oxidation reaction in which Ni in the second precursor thus obtained in the second heat-treating step S32 is oxidized from bivalent Ni to trivalent Ni. Further, the third heat-treating step S33 is carried out for another purpose of growing crystal particles so that the compound (1) obtained in the heat-treatment evolves electrode performance. In short, the third heat-treating step S33 is a heat-treating step of facilitating a Ni oxidation reaction in the second precursor as well as growth of crystal particles.

A heat-treating atmosphere in the third heat-treating step S33 is an oxidative atmosphere that contains oxygen in order to sufficiently proceed with a Ni oxidation reaction of the second precursor in the third heat-treating step S33. Herein, the oxidative atmosphere in the third heat-treating step S33 has preferably an oxygen concentration of 80% or more, more preferably 90% or more, further more preferably 95% or more, and the most preferably 100%. Note, it is preferable to allow oxygen gas to flow during the firing step S3, from the viewpoint of exhausting gas generated from starting raw materials containing metal elements and lithium raw materials, and also supplying a sufficient amount of oxygen to a ground and mixed powder.

Note, when a heat-treating temperature in the finish treating step S33 becomes less than 750° C., crystallization of the second precursor may difficultly proceed. Further, the heat-treating temperature of more than 900° C. cannot prevent decomposition of the layered structure of the second precursor, thereby to produce bivalent Ni, resulting in a decrease in the capacity of the compound (1) thus obtained.

Therefore, adjusting the heat-treating temperature in the third heat-treating step S33 at 750° C. or more and 900° C. or less can facilitate growth of particles of the second precursor and also prevent decomposition of the layered structure, enabling improvement in the capacity of the compound (1) thus obtained. Here, adjusting the heat-treating temperature in the third heat-treating step S33 at 840° C. or more and 890° C. or less can further improve the growing effect of the particles and the preventing effect of the decomposition of the layered structure.

Further, when an oxygen partial pressure is low in the third heat-treating step S33, it is preferable to heat the mixture to facilitate the Ni oxidation reaction. That is, when oxygen is insufficiently supplied to the second precursor in the third heat-treating step S33, it is preferable to increase the heat-treating temperature. However, it should be noted that the increase in the heat-treating temperature may cause decomposition of the layered structure in the compound (1) thus obtained. This defect may fail to afford a favorable electrode property of the cathode active material. Accordingly, it is preferable to set the heat-treating time in the third heat-treating step S33 to 0.5 hr or more and 50 hr or less so as to sufficiently supply oxygen to the second precursor. Further, the heat-treating time in the third heat-treating step S33 is preferably set to 0.5 hr or more and 15 hr or less.

The compound (1) that works as a cathode active material can be obtained through carrying out the respective steps as mentioned above. The compound (1) thus obtained may be ground where necessary. This grinding process can easily convert the compound (1) into a slurry form thereof, allowing a cathode to be easily produced via coating a metal sheet (or current collector) with the slurry.

[3. Lithium Ion Secondary Battery]

A lithium Ion secondary battery (hereinafter, simply referring to as "secondary battery") of the present embodiment is configured provided with a cathode that is produced by converting the cathode active material to a cathode mixture in a slurry form, coating an electrode sheet with the resultant slurry of the cathode mixture, and drying the coated electrode sheet. Here, as long as the secondary battery has the cathode active material of the present embodiment, a configuration of the secondary battery is not specifically limited. For example, the following configurations may be adapted thereto.

Figure 4:
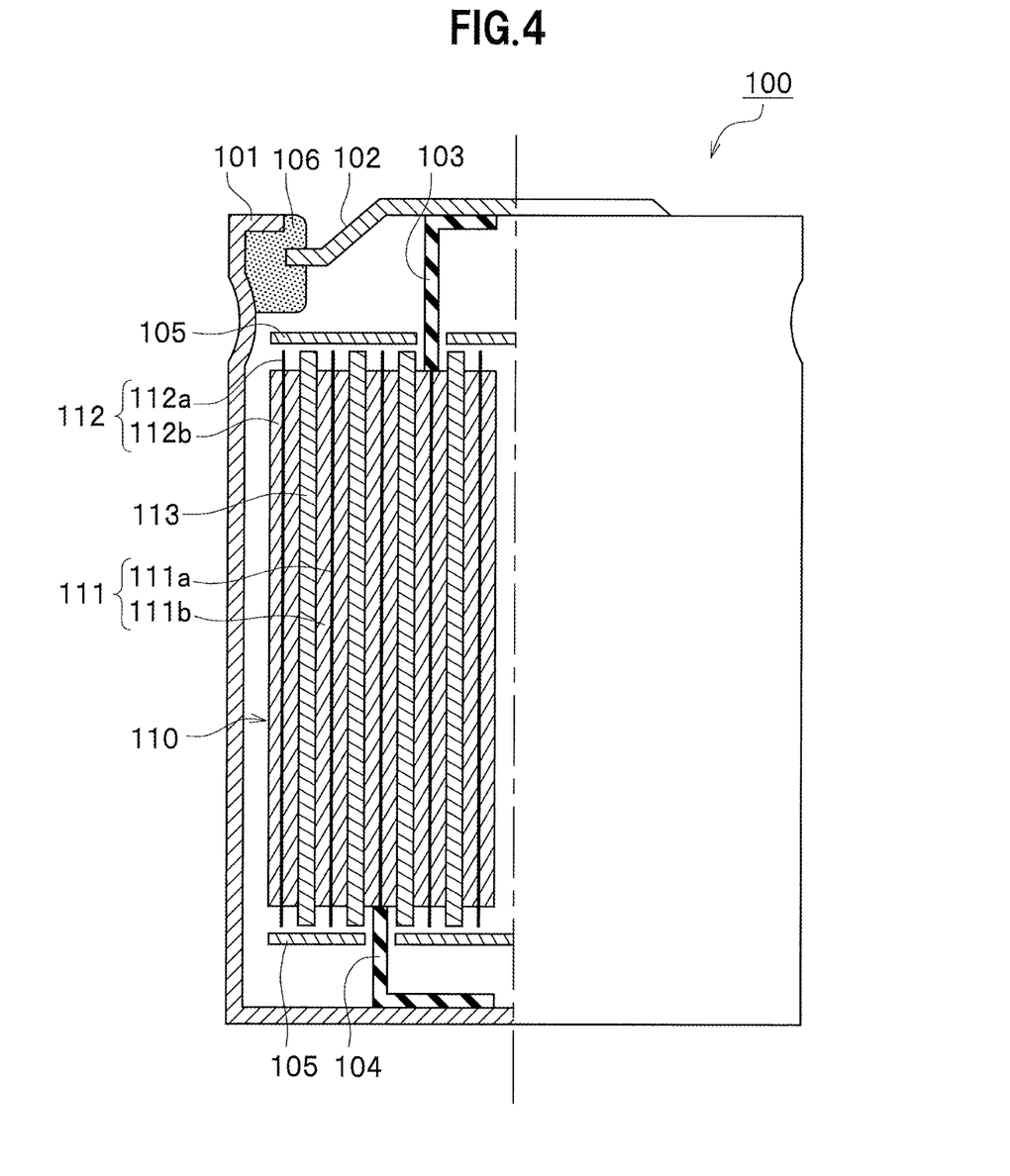
FIG. 4 is a schematic drawing showing a structure of a lithium ion secondary battery of the present embodiment.

FIG. 4 is a schematic diagram showing a structure of the lithium ion secondary battery 100 having the cathode active material of the present embodiment. In FIG. 4, a part of the internal structure of the secondary battery 100 is visually illustrated for convenience of explanation. The secondary battery 100 is a cylindrical lithium ion secondary battery, including a battery can 101 with a bottomed cylindrical shape that houses a non-aqueous electrolyte solution, a wound electrode group 110 housed in the battery can 101, and a battery lid 102 with a disc shape that seals an upper opening of the battery can 101. Note, the secondary battery 100 may have a button shape instead of a cylindrical shape.

The battery can 101 and the battery lid 102 are formed of a metallic material such as aluminum. Further, the battery lid 102 is fixed via caulking, etc. to the battery can 101 through a sealing material 106 made of a resin having an insulation property. This configuration allows the battery can 101 to be sealed by the battery lid 102, and simultaneously the can 101 and the lid 102 to be electrically insulated each other.

The wound electrode group 110 is configured by winding a cathode 111 and an anode 112 both having a long strip shape and positioned oppositely each other via being inserted with a separator 113 having a long strip shape therebetween, around a winding center axis. In the wound electrode group 110, a cathode current collector 111a is electrically connected with the battery lid 102 via a cathode lead piece 103. Further, an anode current collector 112a is electrically connected with a bottom of the battery can 101 via an anode lead piece 104.

Both insulating sheets 105 that prevent a short-cut are arranged both between the wound electrode group 110 and the battery lid 102, and between the wound electrode group 110 and a bottom of the battery can 101. The cathode lead piece 103 and the anode lead piece 104 are respectively members used for extracting a current and produced by using the same materials as of the cathode current collector 111a and the anode current collector 112a, respectively. Further, the cathode lead piece 103 and the anode lead piece 104 are respectively joined to the cathode current collector 111a and the anode current collector 1112a via spot-welding or ultrasonic-welding or the like.

The cathode 111 is provided with the cathode current collector 111a formed of a metal sheet, and a cathode mixture layer 111b formed on a surface of the cathode current collector 111a. The cathode mixture layer 111b is formed including the cathode active material. Further, the anode 112 is provided with the anode current collector 112a formed of a metal sheet, and an anode mixture layer 112b formed on a surface of the anode current collector 112a. The anode mixture layer 112b is formed including any anode mixture (e.g., carbon material) usable for a lithium ion secondary battery.

As for a non-aqueous electrolyte solution usable for the secondary battery 100, usable is any non-aqueous electrolyte solution used for a lithium ion secondary battery. More specifically, usable is a non-aqueous electrolyte solution obtained by dissolving $LiPF_6$ in ethylene carbonate (EC).

As described above, the cathode active material in the present embodiment is used for the secondary battery 100. Therefore, preferably the spreading resistance of the cathode active material included in the cathode 111 of the secondary battery 100 is set to $1.0 \times 10^6$ $\Omega$/cm or more and $1.0 \times 10^{10}$ $\Omega$/cm or less as mentioned hereinbefore. This setting may increase a battery capacity of the secondary battery 100 and simultaneously suppress an increase in the battery resistance, thereby to achieve the excellent cycle properties.

Further, preferably the spreading resistance of the cathode active material included in the cathode 111 even of the secondary battery 100 after subjected to 100 cycles enters the above defined range, from the viewpoint of maintaining excellent cycle properties for a longer period.

More specifically, the secondary battery 100 is charged under the 25° C. environment with the charge/discharge rate of 1 C to the upper limit potential of 4.3V, and subsequently discharged to the lower limit potential of 2.7V. This charge/discharge cycle is repeated by 100 times. Then, the cathode 111 is taken out from the secondary battery 100 after subjected to the 100 cycles, and the spreading resistance of the cathode active material included in the cathode 111 is measured the same as in the initial state. Here, preferably a value of the spreading resistance thus measured for the secondary battery 100 thus subjected to the 100 cycles also enters the above defined range. This procedure can provide the secondary battery with a large battery capacity over a long period as well as excellent cycle properties.

EXAMPLES

Hereinafter, the present invention will be described more specifically referring to Examples.

Example 1

(Preparation and Evaluation of Cathode Active Material)

A cathode active material in Example 1 was prepared by the method previously described as referring to FIG. 3.

First, as for starting raw materials of the cathode active material, lithium carbonate, nickel hydroxide, cobalt hydroxide and manganese carbonate were respectively weighed so that a mole ratio thereof was set to Li:Ni:Co:

Mn=1.04:0.80:0.15:0.05. Then, the weighed raw materials were mixed, and added with pure water so that a solid content concentration was set to 20 mass %. The mixture was sufficiently ground by a grinder, and wet-mixed, thereby to produce a raw material slurry (i.e., grinding and mixing step S1). A concentration of the resultant raw material slurry (i.e., concentration of the raw material mixture in the raw material slurry) was 20 mass %.

Next, the resultant raw material slurry was spray-dried by using a binary fluid nozzle through which the slurry was being supplied at 2 kg/hr, to prepare a precursor of the cathode active material. The precursor was a dry product of the raw material slurry (granulating step S2). Here, the drying temperature was 280° C.

The precursor of the cathode active material was treated for 1 hr at the heat-treating temperature of 350° C. under the atmosphere, so as to produce a powdery first precursor (first heat-treating step S31). Next, the resultant first precursor was heat-treated by using a continuous conveying furnace under the atmosphere with the oxygen concentration of 90% or more inside the furnace, in an oxygen flow at the heat-treating temperature of 600° C. for 10 hr, whereby a powdery second precursor was obtained (i.e., second heat-treating step S32). Further, the resultant second precursor was heat-treated by a continuous conveying furnace under the atmosphere with the oxygen concentration of 90% or more inside the furnace, in an oxygen flow at the heat-treating temperature of 800° C. for 10 hr, whereby a fired powder was obtained (i.e., third heat-treating step S33). The resultant fired powder was classified by a sieve having an aperture of 53 µm or less, and a powder thus passed through the sieve was used as a cathode active material (i.e., cathode active material in Example 1).

Next, a composition of Li, Ni, Co and Mn of the resultant cathode active material was measured by ICP-AES (PerkinElmer Co., Ltd.; OPTIMA8300). As a result, a ratio of Li:Ni:Co:Mn was 1.01:0.8:0.15:0.05. Accordingly, the composition of the obtained cathode active material was revealed to be $Li_{1.01}Ni_{0.8}Co_{0.15}Mn_{0.05}O_2$.

Further, porosity of the cathode active material thus obtained was measured by mercury intrusion porosimetry based on a volume of micro pores having a pore diameter of 0.6 µm or less. As for a measurement device, an automatic porosimeter: Autopore IV9500 was used (Shimadzu Corporation). As a result, the porosity of the cathode active material in Example 1 was revealed to be 12%.

Next, spreading resistance of the cathode active material thus obtained was calculated by the following procedure. First, the cathode active material was ground so as to expose a cross-section of a sample measurable by the scanning spreading resistance microscope that was used in the following experiments. Then, a spreading resistance distribution in the cross-section of the sample was measured by the scanning spreading resistance microscope (Hitachi High-Tech Science Corporation: Type E-sweep). Herein, a single crystal silicone coated with electric conductive diamond having a curvature radius of 100 nm was used as a probe. The cross section in the range of 60 µm×60 µm was measured at a scanning rate of 1.0 Hz. Hereby, spreading resistance just under the probe was measured using a logarithmic amplifier that was sensitive in the range from about 10 kΩ to about 1 TΩ.

Measurement results of the cross-section provided by the scanning spreading resistance microscopy demonstrated that no hollow secondary particles were observed, and all the secondary particles thus observed were only solid secondary particles. Thus, spreading resistance was measured for the particles apparently determined to be secondary particles by an optical microscopic photograph taken using the above defined cross-section. Then, average values of the spreading resistance of the respective secondary particles thus measured on the spreading resistance distribution were calculated, and the calculated average values were further averaged to provide an average value of the cross-section. The resultant average value was defined to be a value of the spreading resistance in said cross-section.

Next, this procedure was performed respectively for three different cross-sections, and values of the spreading resistance calculated for the respective three cross-sections were averaged so that the resultant averaged value was defined as a value of the spreading resistance of the cathode active material in the initial state. Further, secondary particles which were determined to have a uniform inside (i.e., filled inside) by visual observation of the image taken by the scanning spreading resistance microscopy were determined as "solid secondary particles".

A value of the spreading resistance thus calculated as mentioned above was $7.7 \times 10^7$ Ω/cm. Further, it was confirmed that the secondary particles were only solid secondary particles based on the measurement results by the scanning spreading resistance microscopy.

(Preparation and Evaluation of Lithium Ion Secondary Battery)

Next, a cathode used for a lithium ion secondary battery was produced by using the cathode active material thus prepared in Example 1. First, the cathode active material of Example 1, a carbon based conductive material (specifically, acetylene black), a binder dissolved in N-methyl-2-pyrorrydon (NMP) beforehand (specifically, PVdF dissolved in 12 mass % per NMP) were weighed so that the mass ratio of "cathode active material":"conductive material":"binder" became 90:6:4, and mixed together. A slurry of a cathode mixture was obtained by sufficiently being mixed and homogenized.

Then, a surface of a cathode current collector made of aluminum foil with a thickness of 20 µm was coated with the prepared slurry of cathode mixture, so that a coated amount was 10 mg/cm². After that, the slurry of the cathode mixture thus coated on the cathode current collector was heat-treated at 120° C., and the solvents contained in the cathode mixture slurry were removed via volatilization or vaporization, thereby to form a cathode mixture layer on a surface of the cathode current collector. Then, the cathode mixture layer was compression-molded by heat-press to produce a cathode. The produced cathode was evaluated in a cathode density, that is, a density of the cathode mixture layer. As a result, the density of the cathode mixture layer was 3.0 g/cm³.

Next, an anode of the lithium ion secondary battery was produce by using graphite as an anode material. More specifically, graphite and a binder dissolved in water beforehand (specifically, carboxymethylcellulose dissolved at 1.2 mass % per water) were weighed so that a mass ratio of "anode material":"binder" was 98:2, and mixed together. A slurry of an anode mixture was obtained by sufficiently being mixed and homogenized.

Then, a surface of an anode current collector made of copper foil with a thickness of 10 µm was coated with the prepared slurry of anode mixture, so that a coated amount was 6.5 mg/cm². After that, the slurry of the anode mixture thus coated on the anode current collector was heat-treated at 100° C., and the solvents contained in the cathode mixture slurry were removed via volatilization or vaporization, thereby to form an anode mixture layer on a surface of the anode current collector. Then, the anode mixture layer was compression-molded by heat-press to produce an anode.

Next, a button type lithium ion secondary battery was prepared by using the cathode and anode thus produced. Specifically, the cathode was punched in a disk shape with a diameter of 15 mm, and the anode was punched in a disk shape with a diameter of 16 mm. The resultant anode and the cathode were stacked in a non-aqueous electrolyte solution via being inserted with a porous separator made of PP (polypropylene) therebetween. The separator had a thickness of 30 μm, ionic conductivity and an insulating property. The non-aqueous electrolyte solution (or electrolyte) was prepared by dissolving lithium hexafluorophosphate ($LiPF_6$) in a mixture of organic solvents to be 1 mol/L. The mixture of organic solvents included ethylene carbonate (EC) and dimethyl carbonate (DMC) at the volume ratio of 3:7. Then, those materials were housed in a button type battery can to produce a button type lithium ion secondary battery (i.e., hereinafter simply referring to as a secondary battery).

The produced secondary battery was charged to the upper limit potential of 4.3V at a constant current (charge rate of 0.2 C)/of potentiostatic charge in environment of 25° C. with the cathode active material mass standard of 40 A/kg. Then, the secondary battery was discharged at a constant current (i.e., discharge rate of 0.2 C) with the cathode active material mass standard of 40 A/kg down to the lower limit potential of 2.7V. Here, an initial capacity was determined by measuring the discharge capacity at that time. The measurement results showed the initial capacity of the secondary battery in Example 1 was 197 Ah/kg. Note, the term of "kg" in the unit "Ah/kg" represents mass of the cathode active material. This definition is the same as in the following descriptions.

Next, a resistance change caused following charge/discharge cycles of the secondary battery in Example 1 was evaluated. First, the secondary battery was once charged/discharged at 40 A/kg (i.e., charge/discharge rate of 0.2 C) with the cathode active mass standard. Subsequently, the DC resistance when the secondary battery was discharged at 200 A/Kg for 10 sec was measured. Herein, the charge/discharge rate was defined as 1 C. The resultant DC resistance was defined as DC resistance after 1 cycle. After that, the secondary battery was charged at the constant current of 200 Ah/kg (i.e., charge rate of 1 C) to the upper limit potential of 4.3 V, and then discharged at the constant current of 200 Ah/kg (i.e., discharge rate of 1 C) down to the lower limit potential of 2.7 V. This cycle was carried out for 100 cycles. Then, DV resistance of the secondary battery was measured. The resultant DC resistance was defined as DC resistance after 100 cycles.

Next, a resistance change of the secondary battery caused following the discharge/charge cycles, that is, a resistance increase rate after 100 cycles was calculated by dividing the above defined "DC resistance after 100 cycles" by the above defined "DC resistance after 1 cycle". The resistance increase rate thus calculated was 124%. Further, the cathode was taken out from the secondary battery after subjected to the 100 cycles. Then, spreading resistance of particles apparently determined to be secondary particles by the optical microscopic photograph was measured the same as in the measurement of the spreading resistance of the cathode active material at 0 cycle. As a result, a value of spreading resistance of the cathode active material after subjected to the 100 cycles (i.e., after subjected to 100 charge/discharge cycles) was $1.1 \times 10^8$ Ω/cm.

Example 2

A cathode active material (i.e., cathode active material in Example 2) was prepared the same as in Example 1 except that a concentration of slurry used at the preparation of the cathode active material in Example 1 was modified to 30 mass %.

As a result, a composition of the prepared cathode active material had a ratio of Li:Ni:Co:Mn to be 1.01:0.8:0.15:0.05. Accordingly, the composition of the obtained cathode active material was determined to be $Li_{1.01}Ni_{0.8}Co_{0.15}Mn_{0.05}O_2$. Further, porosity and spreading resistance were also measured the same as in Example 1. Results of the measurement showed that the porosity was 3% and a value of the spreading resistance was $1.4 \times 10^7$ Ω/cm.

Further, a secondary battery (i.e., secondary battery in Example 2) was prepared the same as in the method for preparing the secondary battery in Example 1 by using the cathode active material thus prepared as mentioned above. Then, an initial capacity, a ratio of resistance change and a value of spreading resistance of the cathode active material after subjected to the 100 cycles were measured of the prepared secondary battery. As a result, the initial capacity was 195 Ah/kg, the resistance increase ratio was 130%, and the value of spreading resistance after subjected to the 100 cycles was $4.0 \times 10^7$ Ω/cm. Further, the scanning spreading resistance microscopy confirmed that the particles thus prepared were solid secondary particles.

Example 3

A cathode active material (i.e., cathode active material in Example 3) was prepared the same as in Example 1 except that lithium carbonate, nickel hydroxide, cobalt hydroxide, manganese carbonate and titanium oxide were used as starting raw materials of the cathode active material, and the respective starting raw materials were used at the mol ratio of Li:Ni:Co:Ti=1.04:0.80:0.15:0.04:0.01. That is, in Example 3, titanium was used as $M^1$ in Formula (1).

As a result, a composition of the prepared cathode active material had a ratio of Li:Ni:Co:Ti to be 1.01:0.80:0.15:0.04:0.01. Hereby, the composition of the obtained cathode active material was revealed to be $Li_{1.01}Ni_{0.80}Co_{0.15}Mn_{0.04}Ti_{0.01}O_2$. Further, porosity and spreading resistance were also measured the same as in Example 1. Results of the measurement showed that the porosity was 5% and the value of spreading resistance was $6.3 \times 10^6$ Ω/cm. Moreover, the scanning spreading resistance microscopy confirmed that the particles thus prepared were solid secondary particles.

Next, a secondary battery (i.e., secondary battery in Example 3) was prepared the same as in the method for preparing the secondary battery in Example 1 by using the cathode active material thus prepared as mentioned above. Then, an initial capacity, a ratio of resistance change and a value of spreading resistance of the cathode active material after subjected to the 100 cycles were measured of the prepared secondary battery. As a result, the initial capacity was 192 Ah/kg, the resistance increase ratio was 110%, and the value of spreading resistance after subjected to the 100 cycles was $7.8 \times 10^6$ Ω/cm.

Example 4

A cathode active material (i.e., cathode active material in Example 4) was prepared the same as in Example 1 except that aluminum hydroxide instead of manganese carbonate was used as a starting raw material of the cathode active material, and the respective starting raw materials were used at the mol ratio of Li:Ni:Co:Al=1.04:0.82:0.15:0.03, and a heat-treating temperature in the third heat-treating step S33 was modified to 750° C. That is, in Example 4, aluminum was used as $M^1$ in Formula (1).

As a result, a composition of the prepared cathode active material had a ratio of Li:Ni:Co:Al to be 1.02:0.82:0.15: 0.03. Hereby, the composition of the obtained cathode active material was revealed to be $Li_{1.02}Ni_{0.82}Co_{0.15}Al_{0.03}O_2$. Further, porosity and spreading resistance were also measured the same as in Example 1. Results of the measurement showed that the porosity was 9% and the value of spreading resistance was $3.1 \times 10^8$ Ω/cm. Moreover, the scanning spreading resistance microscopy confirmed that the particles thus prepared were solid secondary particles.

Next, a secondary battery (i.e., secondary battery in Example 4) was prepared the same as in the method for preparing the secondary battery in Example 1 by using the cathode active material thus prepared as mentioned above. Then, an initial capacity, a ratio of resistance change and a value of spreading resistance of the cathode active material after subjected to the 100 cycles were measured of the prepared secondary battery. As a result, the initial capacity was 183 Ah/kg, the resistance increase ratio was 110%, and the value of spreading resistance after subjected to the 100 cycles was $4.1 \times 10^8$ Ω/cm.

Example 5

A cathode active material (i.e., cathode active material in Example 5) was prepared the same as in Example 1 except that lithium carbonate, nickel hydroxide, cobalt hydroxide, manganese carbonate and zirconium oxide were used as starting raw materials of the cathode active material, and the respective starting raw materials were used at the mol ratio of Li:Ni:Co:Mn:Zr=1.04:0.80:0.15:0.04:0.01. That is, in Example 5, zirconium was used as $M^1$ in Formula (1).

As a result, a composition of the prepared cathode active material had a ratio of Li:Ni:Co:Mn:Zr to be 1.01:0.80:0.15: 0.04:0.01. Hereby, the composition of the obtained cathode active material was revealed to be $Li_{1.01}Ni_{0.80}Co_{0.15}Mn_{0.04}Zr_{0.01}O_2$. Further, porosity and spreading resistance were also measured the same as in Example 1. Results of the measurement showed that the porosity was 17% and the value of spreading resistance was $4.5 \times 10^9$ Ω/cm.

Next, a secondary battery (i.e., secondary battery in Example 5) was prepared the same as in the method for preparing the secondary battery in Example 1 by using the cathode active material thus prepared as mentioned above. Then, an initial capacity, a ratio of resistance change and a value of spreading resistance of the cathode active material after subjected to the 100 cycles were measured of the prepared secondary battery. As a result, the initial capacity was 196 Ah/kg, the value of resistance increase ratio was 131%, and the spreading resistance after subjected to the 100 cycles was $6.9 \times 10^9$ Ω/cm. Further, the scanning spreading resistance microscopy confirmed that the particles thus prepared were solid secondary particles.

Example 6

As starting raw materials, Lithium sulfate, nickel sulfate, cobalt sulfate and manganese sulfate were respectively weighed so that the mole ratio of Li:Ni:Co:Mn was 1.08: 0.8:0.15:0.04, and mixed together. Then, pure water was added to the mixture so that the solid content concentration was set to 20 mass %. After that, the resultant aqueous solution was added dropwise to a sodium hydroxide aqueous solution (i.e., concentration of 0.2 mol/L). Precipitates thus formed were filtered and dried to afford a transition metal composite hydroxide.

The resultant transition metal composite hydroxide was fired at 500° C., and sufficiently ground. Next, lithium hydroxide and zirconium oxide were mixed to the ground product so that the mole ratio of Li:Ni:Co:Mn Zr became 1.06:0.80:0.15:0.04:0.01. The resultant mixture was heat-treated at 600° C. for 12 hr under an oxygen atmosphere. After that, the product was sufficiently ground, and subsequently finishing-fired at 740° C. for 10 hr, thereby to afford a cathode active material in Example 6.

A composition of the prepared cathode active material had a ratio of Li:Ni:Co:Mn:Zr to be 1.02:0.80:0.15:0.04:0.01. Hereby, the composition of the obtained cathode active material was revealed to be $Li_{1.02}Ni_{0.80}Co_{0.15}Mn_{0.04}Zr_{0.01}O_2$. Further, porosity and spreading resistance were also measured the same as in Example 1. Results of the measurement showed that the porosity was 1% and the value of spreading resistance was $9.4 \times 10^8$ Ω/cm.

Next, a secondary battery (i.e., secondary battery in Example 6) was prepared the same as in the method for preparing the secondary battery in Example 1. Then, an initial capacity, a ratio of resistance change and a value of spreading resistance of the cathode active material after subjected to the 100 cycles were measured of the prepared secondary battery. As a result, the initial capacity was 197 Ah/kg, the resistance increase ratio was 142%, and the value of spreading resistance after subjected to the 100 cycles was $1.4 \times 10^{10}$ Ω/cm. Further, the scanning spreading resistance microscopy confirmed that the particles thus prepared were solid secondary particles.

Example 7

A cathode active material (i.e., cathode active material in Example 7) was prepared the same as in Example 1 except that a composition of the starting raw materials was modified to have the ratio of Li:Ni:Co:Mn=1.01:0.7:0.1:0.2.

As a result, a composition of the prepared cathode active material had a ratio of Li:Ni:Co:Mn to be 1.01:0.7:0.1:0.2. Hereby, the composition of the obtained cathode active material was revealed to be $Li_{1.01}Ni_{0.7}Co_{0.1}Mn_{0.2}O_2$. Further, porosity and spreading resistance were also measured the same as in Example 1. Results of the measurement showed that the porosity was 8% and the value of spreading resistance was $5.8 \times 10^8$ Ω/cm.

Next, a secondary battery (i.e., secondary battery in Example 7) was prepared the same as in the preparing method of the secondary battery in Example 1. Then, an initial capacity, a ratio of resistance change and a value of spreading resistance of the cathode active material after subjected to the 100 cycles were measured of the prepared secondary battery. As a result, the initial capacity was 175 Ah/kg, the resistance increase ratio was 117%, and the value of spreading resistance after subjected to the 100 cycles was $9.2 \times 10^8$ Ω/cm.

Comparative Example 1

A cathode active material (i.e., cathode active material in Comparative Example 1) was prepared the same as in Example 1 except that a concentration of slurry used for preparing the cathode active material was modified to 5 mass %.

As a result, a composition of the prepared cathode active material had a ratio of Li:Ni:Co:Mn to be 1.01:0.80:0.15: 0.05. Hereby, the composition of the obtained cathode active material was revealed to be $Li_{1.01}Ni_{0.80}Co_{0.15}Mn_{0.05}O_2$. Further, porosity and spreading resistance were also measured the same as in Example 1. Results of the measurement showed that the porosity was 33% and the value of spreading resistance was $3.5 \times 10^{10}$ Ω/cm.

Next, a secondary battery (i.e., secondary battery in Comparative Example 1) was prepared the same as in the method for preparing the secondary battery in Example 1. Then, an initial capacity, a ratio of resistance change and a value of spreading resistance of the cathode active material after subjected to the 100 cycles were measured of the prepared secondary battery. As a result, the initial capacity was 185 Ah/kg, the resistance increase ratio was 188%, and the spreading resistance after subjected to the 100 cycles was $2.6 \times 10^{11}$ Ω/cm. Further, the scanning spreading resistance microscopy confirmed that the particles thus prepared were solid secondary particles.

Comparative Example 2

A cathode active material (i.e., cathode active material in Comparative Example 2) was prepared the same as in Example 1 except that only lithium carbonate and cobalt hydroxide were used as the starting raw materials of the cathode active material, amounts of the starting raw materials were made to have a mole ratio of Li:Co=1.04:1.00, and further a heat-treating temperature in the third heat-treating step S33 was modified to 1000° C.

As a result, a composition of the prepared cathode active material had a ratio of Li:Co to be 1.01:1.00. Hereby, the composition of the obtained cathode active material was revealed to be $Li_{1.01}Co_{1.00}O_2$. Further, porosity and spreading resistance were also measured the same as in Example 1. Results of the measurement showed that the porosity was 0% and the value of spreading resistance was $6.0 \times 10^5$ Ω/cm.

Next, a secondary battery (i.e., secondary battery in Comparative Example 2) was prepared the same as in the method for preparing the secondary battery in Example 1. Then, an initial capacity, a ratio of resistance change and a value of spreading resistance of the cathode active material after subjected to the 100 cycles were measured of the prepared secondary battery. As a result, the initial capacity was 145 Ah/kg, the resistance increase ratio was 108%, and the value of spreading resistance after subjected to the 100 cycles was $6.5 \times 10^5$ Ω/cm. Further, the scanning spreading resistance microscopy confirmed that the particles thus prepared were solid secondary particles.

Comparative Example 3

A cathode active material (i.e., cathode active material in Comparative Example 3) was prepared the same as in Example 7 except that a concentration of slurry of the raw materials was modified to 5 mass %.

As a result, a composition of the prepared cathode active material had a ratio of Li:Ni:Co:Mn to be 1.01:0.7:0.1:0.2. Hereby, the composition of the obtained cathode active material was revealed to be $Li_{1.01}Ni_{0.7}Co_{0.1}Mn_{0.2}O_2$. Further, porosity and spreading resistance were also measured the same as in Example 1. Measurement results showed that the porosity was 21% and the value of spreading resistance was $2.0 \times 10^{10}$ Ω/cm.

Next, a secondary battery (i.e., secondary battery in Comparative Example 3) was prepared the same as in the method for preparing the secondary battery in Example 1. Then, an initial capacity, a ratio of resistance change and a value of spreading resistance of the cathode active material after subjected to the 100 cycles were measured of the prepared secondary battery. As a result, the initial capacity was 190 Ah/kg, the resistance increase ratio was 157%, and the spreading resistance after subjected to the 100 cycles was $4.3 \times 10^{10}$ Ω/cm. Further, the scanning spreading resistance microscopy confirmed that the particles thus prepared were solid secondary particles.

<Discussion>

Table 1 shows porosity and a value of spreading resistance of the cathode active material as well as an initial capacity of secondary battery, a resistance increase ratio and a value of spreading resistance after subjected to the 100 cycles, in Examples 1 to 7 and Comparative Examples 1 to 3. Note, a unit of the value of spreading resistance was changed from the above described "Ω/cm" to "×$10^7$ Ω/cm" in Table 1 for convenience of explanation.

TABLE 1

| | | Cathode Material | | Secondary Battery | |
|---|---|---|---|---|---|
| | Porosity (%) | Spreading Resistance in Initial State (×$10^7$ Ω/cm) | Spreading Resistance after 100 cycles (×$10^7$ Ω/cm) | Initial Capacity (Ah/kg) | Resistance Increase Rate (%) |
| Example 1 | 12 | 7.7 | 11 | 197 | 124 |
| Example 2 | 3 | 1.4 | 4.0 | 195 | 130 |
| Example 3 | 5 | 0.63 | 0.78 | 192 | 110 |
| Example 4 | 9 | 31 | 41 | 183 | 110 |
| Example 5 | 17 | 450 | 690 | 196 | 131 |
| Example 6 | 1 | 94 | 1400 | 197 | 142 |
| Example 7 | 8 | 58 | 92 | 175 | 117 |
| Comparative Example 1 | 33 | 3500 | 26000 | 185 | 188 |
| Comparative Example 2 | 0 | 0.06 | 0.065 | 146 | 108 |
| Comparative Example 3 | 21 | 2000 | 4300 | 190 | 157 |

As shown in Table 1, every value of spreading resistance in the initial state entered the range from $1.0 \times 10^6$ Ω/cm to $1.0 \times 10^{10}$ Ω/cm (i.e., $0.1 \times 10^7$ Ω/cm to $1000 \times 10^7$ Ω/cm), in Examples 1 to 7. On the contrary, values of spreading resistance in the initial state did not enter the range from $1.0 \times 10^6$ Ω/cm to $1.0 \times 10^{10}$ Ω/cm in Comparative Example 1 and 3, resulting in large values of spreading resistance in the initial state.

Further, every resistance increase ratio of the secondary batteries in Examples 1 to 7 was substantially about 140% or less, showing sufficiently smaller ratios than those in Comparative Examples 1 and 3. Moreover, initial capacities of the secondary batteries were sufficiently large in Examples 1 to 7. Furthermore, although the value of spreading resistance was small in Comparative Example 2, the initial capacity therein was smallest and 20% to 30% smaller than those in Examples 1 to 7.

Additionally, comparing results in Examples 1-4 and 7 to those in Examples 5 and 6, among all the Examples, demonstrated that the resistance increase ratios were further decreased by setting a value of spreading resistance in the initial state to $0.9 \times 10^9$ Ω/cm (i.e., $90 \times 10^7$ Ω/cm) or less (see Examples 1-4 and 7).

Further investigation of the porosity has revealed that porosity of 1% or more and 20% or less is preferable based on the results in Examples 1 to 7. The ground is that the above range of porosity increases contact points between primary particles, thereby to decrease a value of spreading resistance in the initial state. Moreover, comparing the results in Examples 1-4 and 7 to those in Examples 5 and 6 has revealed that the resistance increase ratio can more decrease by setting the porosity into the range from 3% to 15% (see Examples 1-4 and 7).

Moreover, although data is not shown in Table 1, comparing the results in Examples 1-6 to that in Example 7 has revealed that the initial capacity can be more improved by allowing the cathode active material to have the Ni ratio over 0.7 (i.e., more than 0.7).

The results as mentioned hereinbefore have demonstrated that the cathode active materials in Examples 1 to 7 realize a secondary battery that is provided with a high initial capacity and the excellent cycle properties, and suppresses the increase in the resistance after subjected to the 100 cycles as much as possible.

DESCRIPTION OF REFERENCE NUMERALS

100: Secondary Battery (i.e., Lithium Ion Secondary Battery)
111: Cathode
111a: Cathode Current Collector
111b: Cathode Mixture Layer
112: Anode
113: Separator

The invention claimed is:

1. A cathode active material used for a lithium ion secondary battery, comprising a plurality of secondary particles formed via agglomeration of a plurality of primary particles of a lithium transition metal composite oxide, wherein
spreading resistance distributions of the secondary particles observed in cross-sections at three selected positions of the cathode active material are measured, and average values of spreading resistance of the secondary particles observed in the cross sections are calculated;
the calculated three average values of spreading resistance are further averaged; and
when an averaged value thus obtained is defined as a value of spreading resistance of the cathode active material, the averaged value thus defined is $1.0\times10^6$ Ω/cm or more and $1.0\times10^{10}$ Ω/cm or less.

2. The cathode active material used for a lithium ion secondary battery according to claim 1, wherein the secondary particles comprise solid secondary particles.

3. The cathode active material used for a lithium ion secondary battery according to claim 1, wherein porosity measured by mercury intrusion porosimetry is 1% or more and 20% or less.

4. The cathode active material used for a lithium ion secondary battery according to claim 1, wherein the averaged value of spreading resistance is $0.90\times10^9$ Ω/cm or less.

5. The cathode active material used for a lithium ion secondary battery according to claim 1, wherein porosity measured by mercury intrusion porosimetry is 3% or more and 15% or less.

6. The cathode active material used for a lithium ion secondary battery according to claim 1, wherein the lithium transition metal composite oxide is represented by the following Formula (1):

$$Li_{1+a}Ni_bCo_cMn_dM^1_eO_{2+\alpha} \quad \text{Formula (1)}$$

where is a metal element other than Li, Ni, Mn and Co; "a", "b", "c", "d", "e" and "α" are respectively numerals satisfying the following conditions: $-0.03 \leq a \leq 0.11$, $0.7 \leq b \leq 1.0$, $0 < c < 0.3$, $0 \leq d < 0.3$, $0 \leq e < 0.1$, $b+c+d+e=1$, $-0.2 < \alpha < 0.2$.

7. A lithium ion secondary battery, comprising a cathode active material according to claim 1.

8. The lithium ion secondary battery according to claim 7, comprising a cathode active material included in a cathode of a lithium ion secondary battery subjected to 100 charge/discharge cycles, wherein
a charge/discharge cycle is carried out via charging the secondary battery to an upper limit potential of 4.3 V, and subsequently discharging the secondary battery down to a lower limit potential of 2.7 V under 25° C. environment with charge/discharge rate of 1 C.

* * * * *